United States Patent
Regunathan et al.

(10) Patent No.: US 6,337,014 B1
(45) Date of Patent: Jan. 8, 2002

(54) NONSOLVENT, SEALED SEPTUM CONNECTION FOR A WATER TREATMENT CARTRIDGE

(75) Inventors: Perialwar Regunathan, Wheaton; Marcus Donald McLeod, Westmont, both of IL (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/475,853

(22) Filed: Dec. 30, 1999

(51) Int. Cl.⁷ .......................... B01D 27/00; B01D 27/08
(52) U.S. Cl. .................. 210/232; 210/238; 210/416.3; 210/444
(58) Field of Search ................... 210/232, 238, 210/416.1, 416.3, 440, 444, DIG. 17

(56) References Cited

U.S. PATENT DOCUMENTS

| | | | |
|---|---|---|---|
| 4,654,142 A | * | 3/1987 | Thomsen et al. |
| 4,857,189 A | | 8/1989 | Thomsen et al. |
| 4,956,086 A | * | 9/1990 | Thomsen et al. |
| RE34,031 E | | 8/1992 | Thomsen et al. |
| 5,711,872 A | * | 1/1998 | Jones et al. |
| 5,871,641 A | * | 2/1999 | Davidson ................ |

* cited by examiner

Primary Examiner—David A. Simmons
Assistant Examiner—Fred Prince
(74) Attorney, Agent, or Firm—Greer, Burns & Crain, Ltd.

(57) ABSTRACT

A button for providing a physical and sealing connection between a septum and an outlet stack of a water treatment cartridge having an opening. The button includes a first end, a second end opposite the first end, and a central portion which connects the first end to the second end. Located on the first end, there is a plurality of flexible locking members, configured for being inserted into the opening. To attach the button to the outlet stack, the locking members lockingly engage the outlet stack. The central portion has an annular groove provided with an O-ring. The O-ring facilitates a sealed connection between the button and the outlet stack. The button is connected to the septum by the use of either a washer and nonsolvent glue or heat staking.

22 Claims, 5 Drawing Sheets

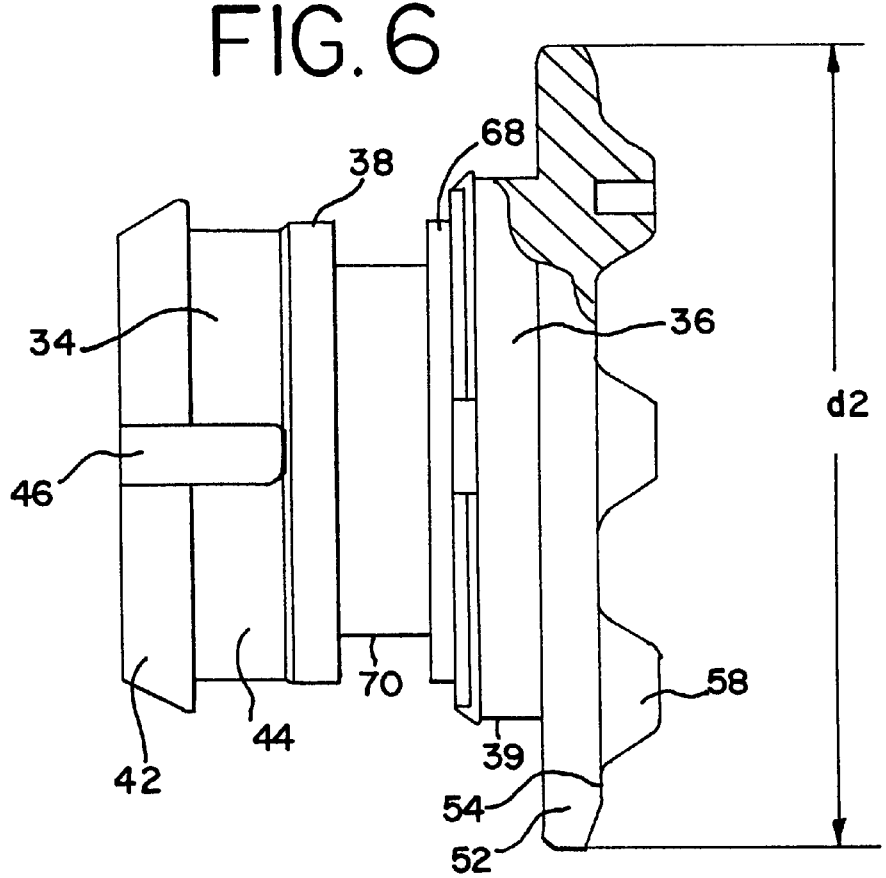
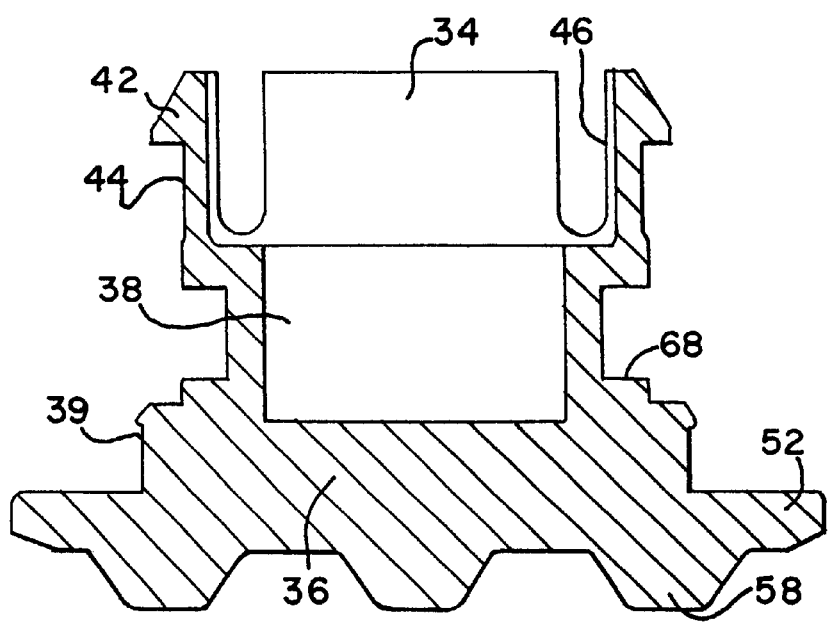

NONSOLVENT, SEALED SEPTUM CONNECTION FOR A WATER TREATMENT CARTRIDGE

FIELD OF THE INVENTION

This invention relates to filter cartridges for drinking water treatment systems, and more specifically to a button for establishing a nonsolvent, physical and sealed connection between a septum and an outlet stack in a water treatment cartridge.

BACKGROUND OF THE INVENTION

This invention deals with a water treatment cartridge of the type disclosed in U.S. Pat. Nos. 4,857,189 and RE 34,031, both of which are incorporated by reference herein. These cartridges disclose a precoat style of filtration where the treated, activated carbon media filters the water, and in so doing adheres to a bag-like, porous filter septum located in the cartridge. As water enters an inlet to the cartridge and proceeds through an inlet passage, it moves through the filter media, then through the septum and out through an outlet stack and an outlet port. To establish fluid communication between the septum and the outlet stack, a button is used. The button contains a first tubular portion having a throughbore, and a second portion connected to the first portion and having a radially projecting flange with an edge and a diameter.

The flange is configured to be attached to the inside of the septum. A washer is then slid over the first portion and abuts the outside of the septum. Then, using a chemical solvent-type adhesive such as methyl ethyl ketone (MEK) to hold the washer through the layers of the septum against the flange, the washer and flange are bonded. The first portion of the button is press fit into the outlet stack and is then secured with a chemical adhesive to the outlet stack to ensure the connection. The preferred chemical adhesive is a mixture of MEK and ABS and is commercially available under the designation Weld On 3039, made by Industrial Polychemical Co. of Gardenia, Calif., as well as SP-412 ABS Cement, made by C.P. Moyen Co. of Skokie, Ill.

Alternatively, a suitable mixture of this adhesive is made by pouring 1 gallon of the MEK into a container and mixing in 7.5 pounds of scrap ABS. After the mixture has stood for about 12 hours and softened, it is stirred into an even texture and placed in a covered container. This mixture ensures a physical as well as a sealed connection. Establishing a sealed connection is important because the water must go through the button to the outlet stack, and must not seep out.

However, the use of solvent type adhesives such as MEK and the ABS/MEK mixture creates numerous problems in the manufacture and use of the water treatment cartridges. First of all, the adhesives are time consuming to apply, since the processes are done manually. Also, during manufacture, time is needed for the adhesives to dry, further elongating the process. Thus, there is a need for a connection which is easier and less time consuming to assemble during manufacture.

There are also disadvantages to the prior art construction once the cartridge is in use. By using the MEK solvent, there is a concern by some that it might enter into the treated water. Since the purpose of a water filtration of this type is to clean the water, the possibility of the solvent contaminating the water is a problem. Thus, there is also a need for a nonsolvent, sealing connection of the septum to the outlet stack so that the water remains clean of impurities.

Accordingly, an object of this invention is to provide a new and improved button for establishing a positive physical and sealed connection between the septum and the outlet stack.

Another object of this invention is to provide a new and improved button construction which can establish a sealed connection that is easier and less time consuming to assemble during manufacture.

Yet another object is to provide a new and improved button which can establish a sealed connection without the use of chemical solvents.

SUMMARY OF THE INVENTION

These and other objects are met or exceeded by the present outlet stack assembly and button, which features a water treatment cartridge that is assembled without the use of solvent. Instead, the present invention utilizes a combination of friction fit and O-rings to provide a positive attachment and seal within the cartridge. In addition to modifying the button, the outlet stack is also specifically dimensioned to facilitate such friction fit and sealed connection.

More specifically, the present water treatment cartridge includes a button for attaching and enabling fluid communication between a septum and an outlet stack of a water treatment cartridge. The septum has an inside, an outside and a plurality of layers. Included in the outlet stack is an opening, a side portion and an annular portion. The button includes a first end with a generally circular portion having a diameter and a plurality of flexible locking members. Opposite the first end on the button is a second end having a generally circular, radially extending flange portion with a diameter and an edge. The flange is configured for attachment to the inside of the septum. Also provided on the button is a central body portion connecting the first and second ends, which has a throughbore and a sealing formation.

On the button, each of the locking members is configured to be inserted into and to abut the annular portion of the outlet stack and is used to attach the button to the outlet stack. To further aid in the attachment of the button to the outlet stack, the locking members are preferably barbs having barb supports. Preferably, adjacent barbs and barb supports are separated by an elongated notch. The configuration of the barbs and barb supports thus eliminates the use of solvent type adhesive (also sometimes referred to below as "solvent") or glue during assembly. This eliminates the possibility of contamination, as well as hastening the production process. To further ensure ease of assembly, the barb support has a length which, when combined with the separating notch, is dimensioned so that the barb support is flexible.

To connect the button to the septum, the flange is configured to engage the inside of the septum. Also, there is a washer which abuts the outside of the septum, sandwiching the septum between the washer and the flange. However, instead of using solvent to bond the washer to the flange, the button utilizes friction and at least one radially extending tab which is located on the central portion. The washer is configured such that it frictionally engages the central portion of the button. Also, the tab is located a distance from an end of the central portion sufficient to securely hold a plurality of layers of the septum against the washer. Beads of nonsolvent adhesive glue may be used around the washer to further attach the washer to the septum. This creates a nonsolvent, attachment between the button and the septum. By using only a minimal amount of glue, or no glue at all, the production time can be decreased. Also, since the glue used is nonsolvent, the problem of the water becoming contaminated is eliminated. In another embodiment of the invention, the washer is eliminated, and the button is preferably heat staked to the septum.

Another feature of the present cartridge is that the outlet stack is provided with an axially extending barrel which defines the button-receiving opening. The barrel is dimensioned so that the barbs tightly engage an edge of the barrel. An opposite end of the barrel is contacted by a shoulder on the button so that the button is securely retained in the barrel.

Since the connection must also be sealed to prevent seepage, the central body portion is configured for establishing a sealed connection between said button and the outlet stack. In the preferred embodiment of the invention, the sealed connection is created by the use of an O-ring, which fits into the annular groove. The O-ring creates a sealed connection, which eliminates any seepage of the water through the button.

BRIEF DESCRIPTION OF THE DRAWINGS

FIG. 6 is a different side view of the button;

FIG. 7 is a vertical section of the button with a tab;

DETAILED DESCRIPTION OF THE INVENTION

The present invention provides for a connector which establishes a nonsolvent, sealed connection between an outlet stack of a water treatment cartridge and a septum. A button according to the present invention utilizes a first end, which has a plurality of barbs and barb supports to engage an annular portion and an opening in the outlet stack. Also, the button has an O-ring which provides a sealed connection between the button and the outlet stack. To connect the button to the septum, a washer or heat staking may be used to bond a second end of the button to the septum.

Figure 1:
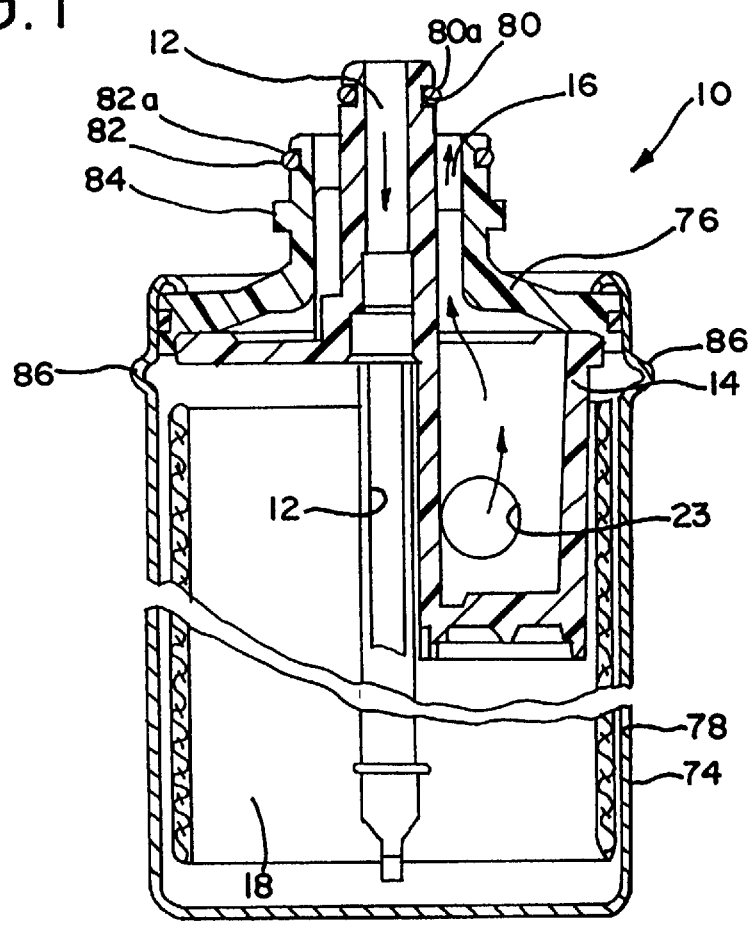
FIG. 1 is a vertical sectional view of a water treatment cartridge suitable for use with the present invention.

Referring now to FIG. 1, a water treatment cartridge, generally designated 10 is shown and a general explanation of the flow of water will be described. The water treatment cartridge 10 has an inlet port 12, where unfiltered water flows into the cartridge 10. The water flows through the cartridge 10 in the direction generally shown by the arrow. As the water flows through the cartridge 10, it encounters an activated carbon based filter media (not shown) which purifies the water. Through interaction with the incoming water, a portion of the media becomes attached to a corrugated septum (depicted in FIG. 3). Being finely porous, the septum permits the entry of filtered water. Filtered water then flows from the septum into an outlet stack 14 which is connected to an outlet opening 16.

Figure 2:
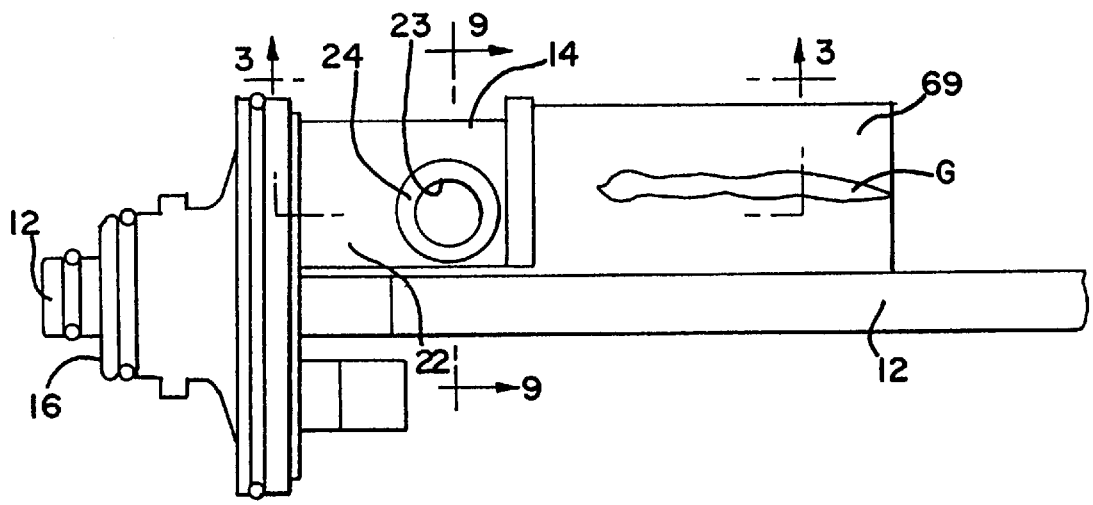
FIG. 2 is a side elevational view of an outlet stack of the water treatment cartridge.
Figure 3:
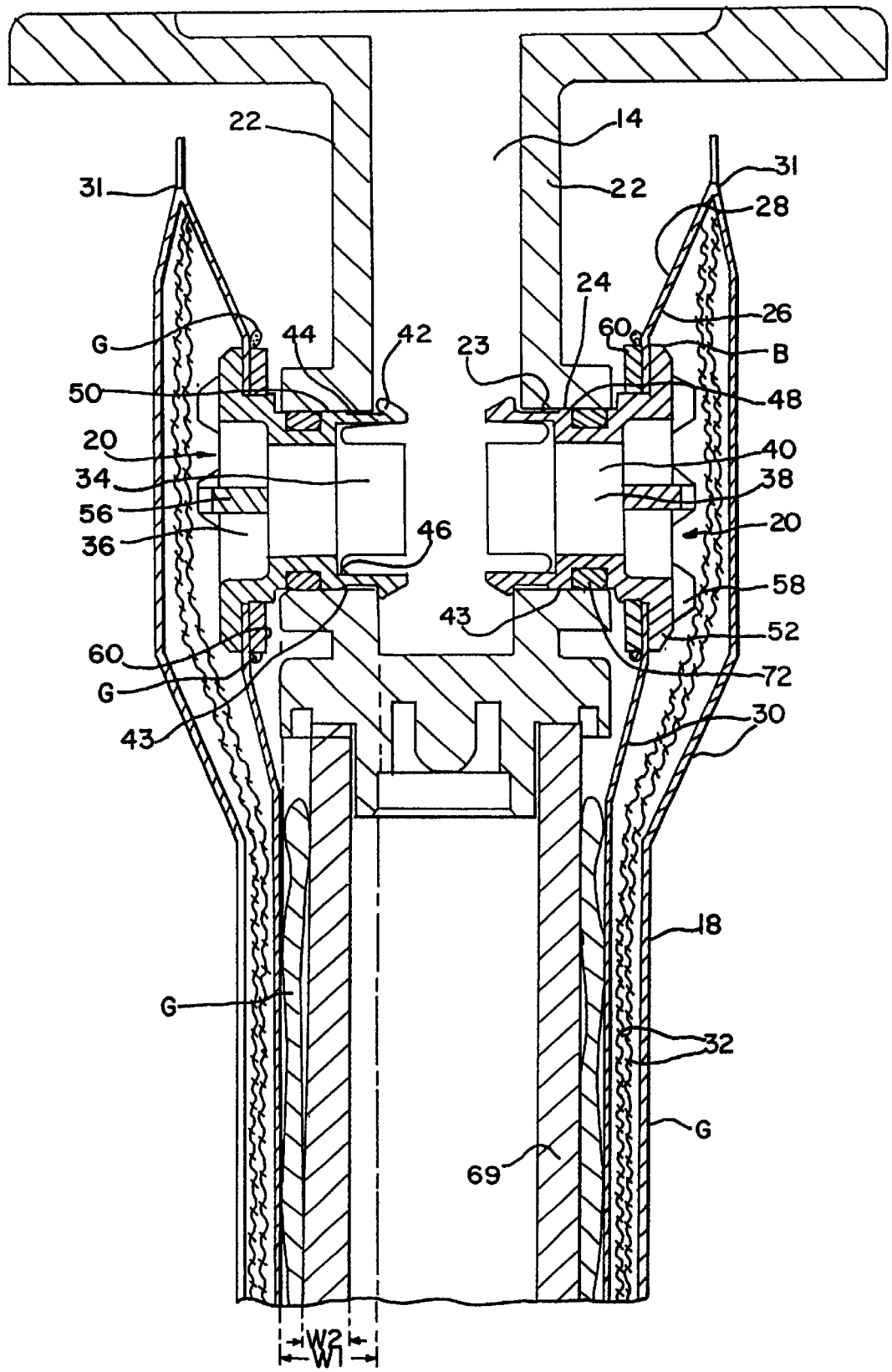
FIG. 3 is a sectional view taken along the line 3—3 of FIG. 2 and in the direction indicated generally.
Figure 4:
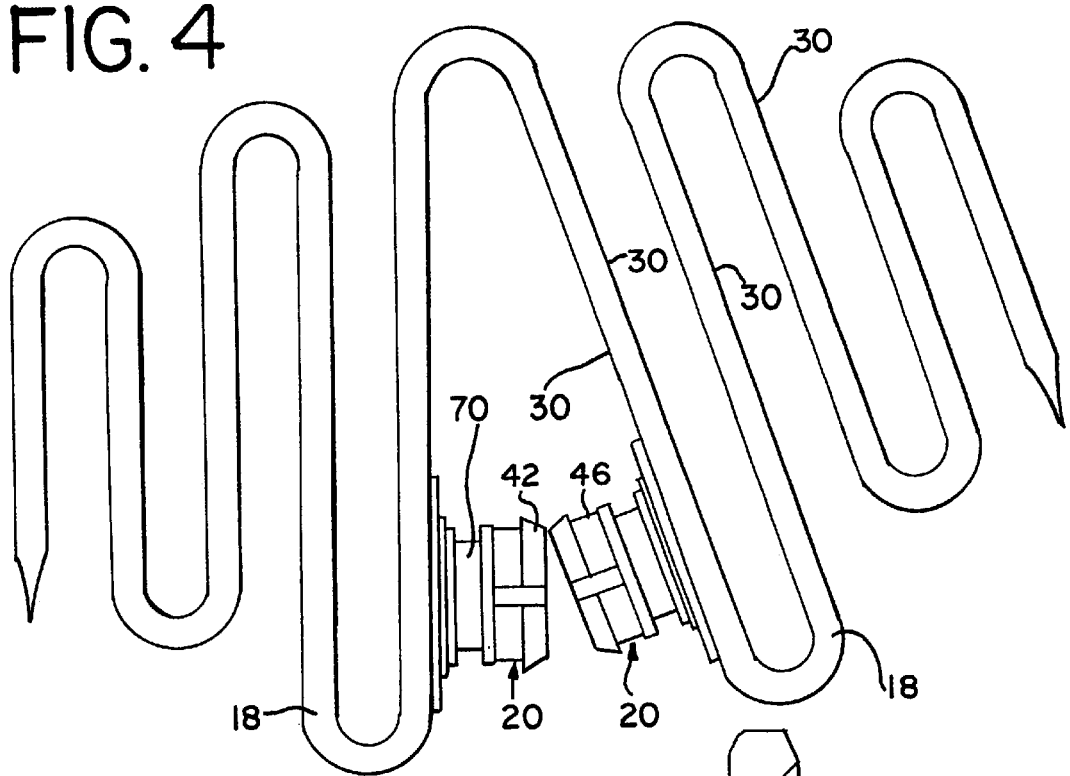
FIG. 4 is an overhead plan view of a septum and two buttons.

Turning now to FIGS. 2 and 3, the outlet stack 14 is shown and upon assembly is attached to a septum 18 using a button 20. Turning first to the features of the outlet stack 14, it includes a sidewall 22, an opening 23 and an annular barrel portion 24, which defines the opening 23. Also shown in FIG. 3 is the septum 18, which has an inside surface 26, an outside surface 28, and at least one layer 30. Preferably, a pair of layers 30 are sealed at their respective peripheral edges 31 to form a bag. At least one and preferably two layers of mesh 32 are also included between adjacent inside surfaces 26 of the septum 18, to help maintain a pathway for the water as it flows through the septum 18 by preventing adjacent layers 30 from becoming adhered to each other and blocking fluid flow.

Figure 5:
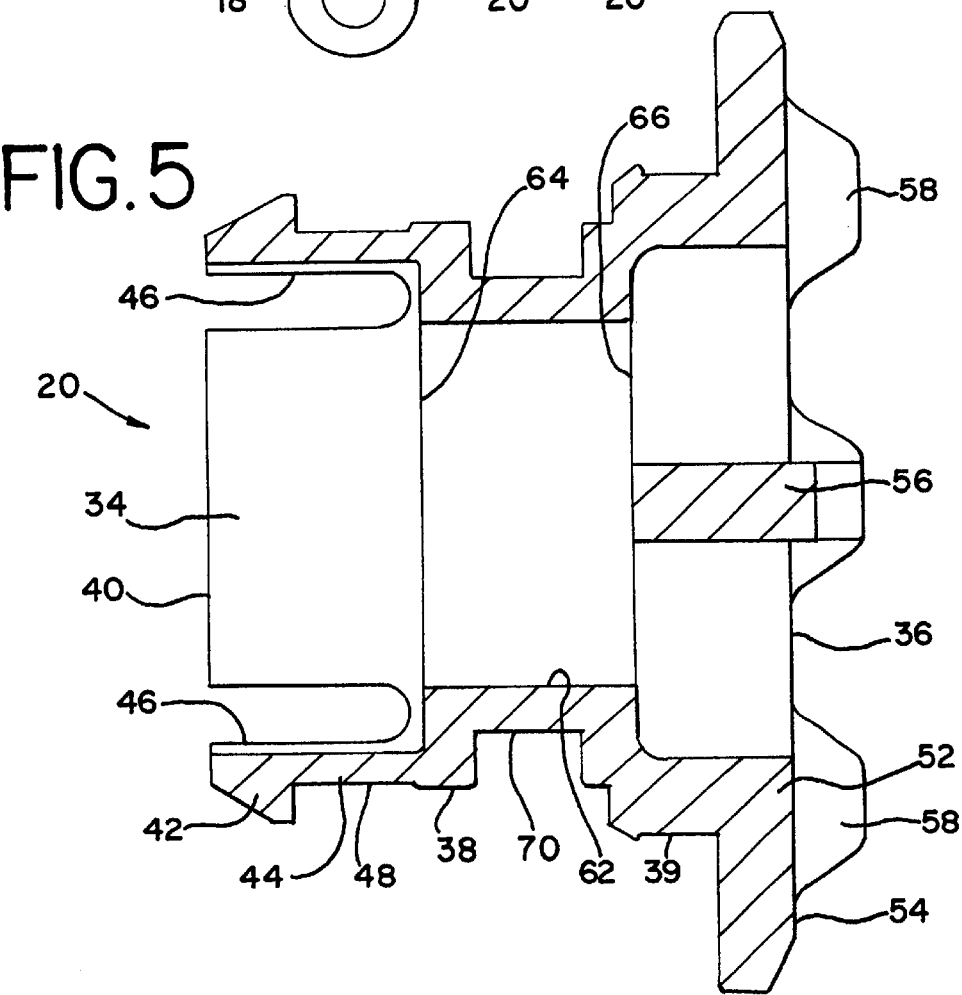
FIG. 5 is a vertical section of the present button.

Referring now to FIG. 5, the generally tubular button 20 attaches and enables fluid communication between the septum 18 and the outlet stack 14. Included on the button 20 is a first end 34, a second end 36 which is opposite the first end 34, and a central body portion 38 which connects the first end 34 and the second end 36. The first end 34 includes a generally circular cylindrical portion 40, which has a diameter d1 (best shown in FIG. 8). Located on the first end 34 is a plurality of locking formations, which in the preferred embodiment are radially projecting barbs 42 and corresponding barb supports 44. However, it is contemplated that other types of elongated projections which lockingly engage the annular portion 24 are also suitable.

Preferably, each barb 42 has a barb support 44, and the first end 34 has three barbs 42, although other numbers are contemplated. Adjacent barbs 42 and barb supports 44, which are preferably formed integrally with the button 20, are separated by an elongated notch 46. Preferably, each notch 46 has a width in the approximate range of 0.060 to 0.070 inches which is approximately in the range of 30 to 40% of a width of the opening 23 of the outlet stack 14, and a depth in the approximate range of 0.165 to 0.180 inches, although other sizes are contemplated, depending on the application.

Referring back to FIG. 3, the barbs 42 are configured to be inserted into the opening 23 of the outlet stack 14, and to abut an interior surface 43 of the annular barrel portion 24 of the outlet stack 14. This allows the button 20 to be connected to the outlet stack 14. The annular barrel portion 24 of the outlet stack 14 has a width w1 which is thicker than a width w2 of the sidewall 22. By having a greater width, the annular portion 24 can accept greater pressure and provide an increased surface area for a positive, sealed connection between the barbs 42 and the annular portion.

By utilizing the barbs 42 to connect the button 20 to the outlet stack 14, assembly is made easier. In production, the barb supports 44 are made of a length which allows them to be flexible, which is also aided by the depth of the notch 46. This also eases the assembly, since the barb supports 44 may flex while being pushed into the opening 23. As is known in the art, the flexibility of the barb support 44 may be varied by modifying the length of the support, the size of the notch 46, and the material of which the button 20 is made.

Figure 9:
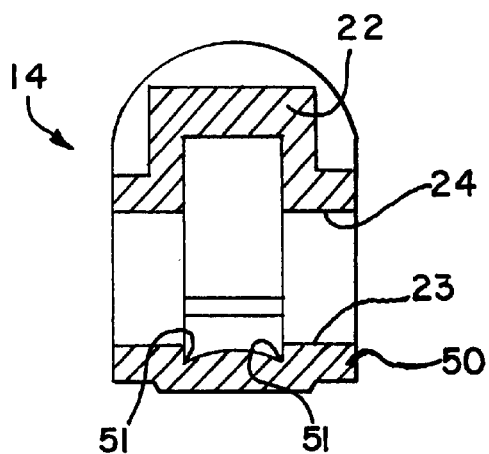
FIG. 9 is a partial view of a wall of the outlet stack, taken along the line 9—9 of FIG. 2 and in the direction indicated generally.

To further ease the assembly, the annular portion 24 has a wall 50 which is generally C-shaped or dished in cross-section (best shown in FIG. 9). The C-shaped wall 50 forms areas of larger clearance 51 which allow the button 20 to slide easily into place during assembly and provides room for the barbs 42.

Figure 8:
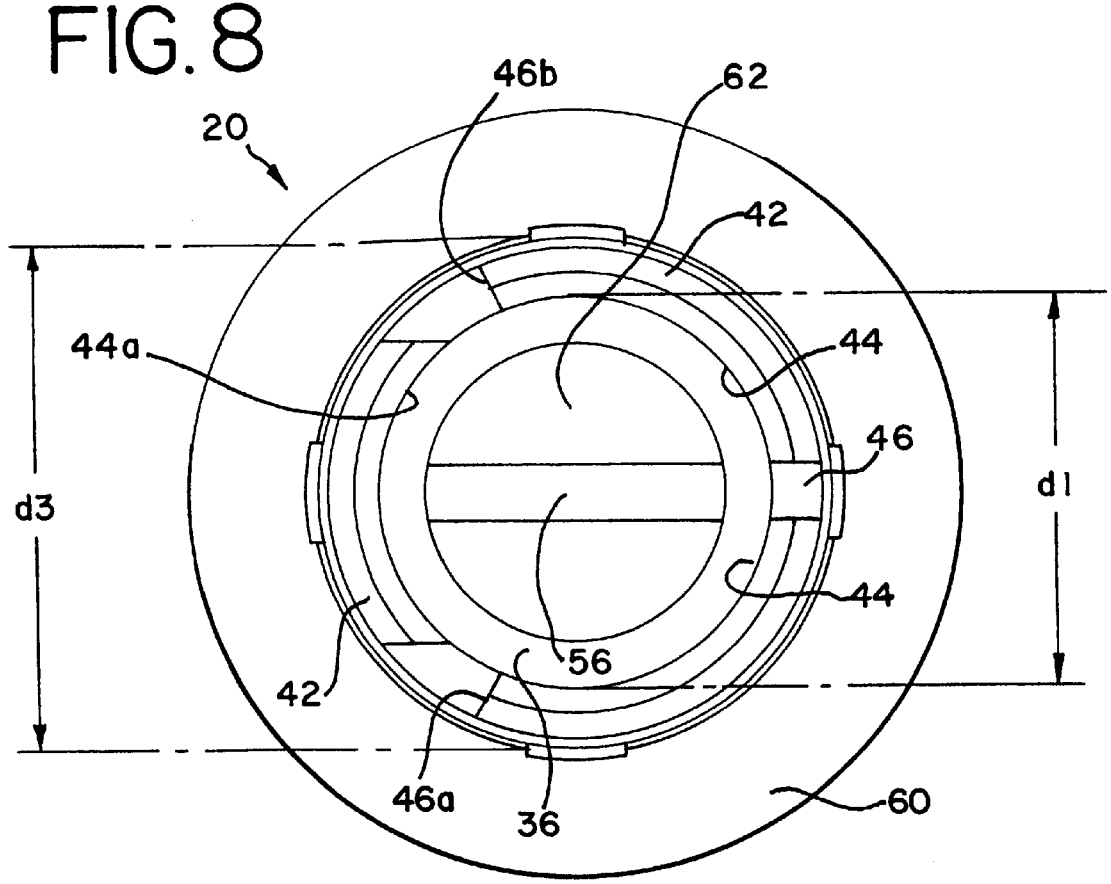
FIG. 8 is top view of the button of FIG. 5.

Referring now to FIG. 8, another feature of the button is that the barb supports 44 are configured to allow side action during the production of the button 20. More specifically, a barb support 44a has a shortened arcuate width than the barb supports 44. Consequently, the elongated notches 46a, 46b are widened to allow side action of the injection molding machinery as is known in the art.

Turning now to FIG. 6, opposite the first end 34 is the second end 36, which has a generally circular, radially extending flange 52 having an edge 54 and a diameter d2. Returning to FIG. 3, the flange 52 is configured to be attached to the inside 26 of the septum 18. As water flows into the button 20, the water exerts pressure on the septum 18, pushing the septum into the flange 52, which would clog the flange. This is prevented by the use of the mesh 32 between the layers of fabric 30 in the septum 18. To further prevent any clogging, the flange 52 has a bar 56 (best shown in FIG. 5) extending across the diameter d2. The flange 52 also has a plurality of bosses 58 across the edge 54 of the flange. The bar 56 and the bosses 58 help keep the septum 18 from entering into the button 20.

Referring now to FIGS. 3, 6 and 8, in a preferred embodiment of the present invention, the use of a washer 60 which has an inner diameter d3, aids in holding the flange 52 in place. The inner diameter d3 of the washer 60 is greater than the diameter d1 of the first end 34 (best shown in FIG. 8). This allows the washer 60 to slide over the first end 34 and abut the outside 28 of the septum 18. The septum 18 is then sandwiched between the washer 60 and the flange 52. In the preferred embodiment, the central portion 38 has a radially expanded annular shoulder 39 which has a relatively larger diameter to create a press fit with the inner diameter d3 of the washer 60. Furthermore, the shoulder 39 acts as a stop for an end of the annular barrel portion 24 opposite the barbed end 34.

Connecting the first end 34 and the second end 36 is the central portion 38. The central portion 38 has a throughbore 62 (shown in FIG. 8), a barb end 64 and a flange end 66. The throughbore 62 allows for the flow of water through the button 20. In the preferred embodiment, the central portion 38 also has at least one radially extending tab 68 (best shown in FIG. 7). The tab 68 snaps over the washer 60 and helps hold the washer against the septum 18. Preferably, there are four tabs 68 equally spaced around the central portion 38, although other numbers are contemplated. The tabs 68 are preferably located far enough away from the flange end 66 of the central portion 38 to hold the plurality of layers 30 of the septum 18 against the washer 60.

To ensure maximum hold, the washer 60 may be coated with beads of nonsolvent glue G (best seen in FIG. 3). Another alternative would be to layer glue G in between the outside 28 of the septum 18 and a glue support 69 of the outlet port 14 (best seen in FIG. 3). In the preferred embodiment, the glue G is JET-MELT "LM" brand adhesive, which is manufactured by 3M of Minneapolis, Minn. As opposed to the mixture used in the prior art, this glue is a solvent free glue which is of food grade and underwater resistant. However, both of these alternatives are time consuming, as the glue must be manually applied. In one embodiment, it is contemplated that the washer 60 need not be used at all, and the button 20 is heat staked to the septum 18. This would be less time consuming and would also involve less materials and ease the production and assembly process. Any of these arrangements provide a nonsolvent connection between the button 20 and the septum 18.

For the button 20 to work properly, there must also be a sealed connection between the button and the outlet port 14. To help accomplish this, the central portion 38 has a sealing formation, preferably in the form of an annular groove 70, which is closer to the flange end 66 of the central portion (best shown in FIG. 5) than to the barb end 64. An O-ring 72 is slid over the central portion 38 and is accommodated within the annular groove 70. Once the O-ring 72 is engaged in the annular groove 70, a sealed connection may be established between the button 20 and the outlet stack 14, thus preventing any seepage of water. It is also contemplated that other types of seals may be substituted for the annular groove 70 and the O-ring 72, such as an O-ring in the annular portion 24, or an annular sealing flap flange formed to radially project from the central portion 38. Also, by using the O-ring 72, and not MEK, a nonsolvent sealed connection is created, eliminating concerns of the solvent contaminating the water.

Returning now to FIG. 1, a general description of the outlet stack 14 will be given. The water treatment cartridge 10 includes an open topped pressure vessel 74, a closure member 76, and the septum is disposed in the pressure vessel and attached to the outlet stack using the present buttons 20. O-ring seals 80 and 82 are disposed in recesses 80a and 82a respectively. The O-rings 80, 82 form a seal when the water treatment cartridge 10 is inserted into a head member (not shown) as is known in the art for use. Also, a pair of oppositely disposed bayonet lugs 84 are formed on the outer periphery of the treatment cartridge 10. In addition, the pressure vessel 74 is preferably provided with at least two crease-like folds 86. The lugs 84 and the creases 86 act in cooperation with corresponding formations on the head member (not shown) to retain the cartridge 10 in fluid communication with the head.

The many advantages of the present invention are now apparent. First, the water treatment cartridge 10 can be easily assembled. There is little use of glue which needs to be manually applied and also, since there is less glue, there is also less time needed to wait for the glue to dry. The button 20 can be easily slid into place during assembly. Second, the button does not use any solvent type adhesive, which significantly reduces the possibility of the water becoming contaminated through the action of the present cartridge.

While various embodiments of the present nonsolvent, sealed septum connection for a water treatment cartridge have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A button for attaching and enabling fluid communication between a septum having an inside, an outside and at least one layer, and an outlet stack of a water treatment cartridge having an opening and an annular portion, comprising:

a first end with a generally circular portion having a diameter and a plurality of flexible locking members configured to be inserted into the opening and to abut the annular portion of the outlet stack to attach said button to the outlet stack;

a second end opposite said first end and having a generally circular, radially extending flange portion with a diameter and an edge, said flange being configured for attachment to the inside of the septum; and a central body portion connecting said first and second ends and having a throughbore for allowing flow of fluids through said button and a sealing formation.

2. The button according to claim 1, wherein each of said locking members is a barb having an associated barb support.

3. The button according to claim 2, further comprising three barb supports.

4. The button according to claim 2, further including a plurality of said barb supports, wherein one of said plurality of barb supports is configured to allow side action during manufacturing of said button.

5. The button according to claim 2, further including an elongated notch separating adjacent barbs and barb supports, wherein each of said barb supports has a length dimensioned so that said barb support is flexible.

6. The button according to claim 5, wherein each said notch has a width which is in the approximate range of 30 to 40% the size of a width of the opening in the outlet stack.

7. The button according to claim 5, wherein each said notch has a width in the approximate range of 0.060 to 0.070 inches and a depth in the approximate range of 0.165 to 0.180 inches.

8. The button according to claim 1, wherein said sealing formation is configured for establishing a sealed connection between said button and the outlet stack.

9. The button according to claim 8, wherein said sealing formation includes an O-ring which is received in an annular groove.

10. The button according to claim 1, further comprising a washer having an inner diameter greater than said diameter of said first end of said button, wherein upon assembly said washer abuts the outside of the septum, such that said septum is sandwiched between said washer and said flange.

11. The button according to claim 10, wherein said inner diameter of said washer is dimensioned to frictionally engage said diameter of said button.

12. The button according to claim 10, wherein said washer is coated with at least one bead of food grade glue which circumscribes said washer to attach said washer and said button to the septum.

13. The button according to claim 10, wherein said central portion further includes at least one radially extending tab for retaining said washer against the flange.

14. The button according to claim 13, wherein said at least one radially extending tab is disposed on said central portion closer to a flange end of said central portion.

15. The button according to claim 14, wherein said at least one tab is located a distance from said flange end of said central portion sufficient to hold the at least one layer of the septum against said washer.

16. The button according to claim 1, wherein said button is secured to the septum by heat staking.

17. The button according to claim 1, wherein said flange has a plurality of bosses around said edge of said flange.

18. The button according to claim 1, wherein said flange has a bar extending across said diameter of said flange.

19. An assembly of a water treatment stack for use in a water filter cartridge, comprising:

a septum having an inside and an outside;

an outlet stack having a sidewall and an opening defined by an annular barrel portion of said outlet stack having a relatively thicker wall than said sidewall; and a button for attaching and enabling fluid communication between said septum and said outlet stack, said button having a first end with a generally circular portion having a diameter and a plurality of flexible locking members for lockingly engaging an end of said barrel portion, a second end opposite said first end and having a generally radially extending flange portion with a diameter, said flange being configured for attachment to the inside of the septum, and a central body portion connecting said first and second ends and having a first end, a second end, a throughbore for allowing flow of fluids through said button and an annular sealing formation for sealingly engaging said annular barrel portion.

20. The assembly according to claim 19, wherein at least a portion of said wall of said annular barrel portion is generally C-shaped to allow said button to easily slide into place during assembly of the water treatment cartridge.

21. The assembly according to claim 19, wherein said button has an annular shoulder adjacent said second end for engaging an end of said annular barrel portion opposite said locking members.

22. The assembly according to claim 19, wherein each of said flexible locking members is a barb having an associated barb support and an elongated notch separating adjacent barbs and barb supports.

* * * * *